United States Patent [19]

Stencel et al.

[11] Patent Number: 6,036,418
[45] Date of Patent: Mar. 14, 2000

[54] SELF-EXPANDING BLIND FASTENER WITH MECHANICAL LOCK

[75] Inventors: Edgar L. Stencel, Sarasota, Fla.; Paul Krawiec, Hacienda Hts., Calif.

[73] Assignee: Monogram Aerospace Fasteners, Inc., Los Angeles, Calif.

[21] Appl. No.: 09/133,150

[22] Filed: Aug. 12, 1998

[51] Int. Cl.[7] ................................................ F16B 13/06
[52] U.S. Cl. .............................. 411/54.1; 411/43; 411/38
[58] Field of Search .............................. 411/54.1, 38, 34, 411/43, 45, 55, 339

[56] References Cited

U.S. PATENT DOCUMENTS

| | | |
|---|---|---|
| 2,061,628 | 11/1936 | Huck . |
| 2,282,711 | 5/1942 | Eklund . |
| 2,765,699 | 10/1956 | LaTorre . |
| 2,868,056 | 1/1959 | Torre .......................................... 411/45 |
| 2,887,003 | 5/1959 | Brilmyer . |
| 2,915,934 | 12/1959 | Torre .......................................... 411/45 |
| 3,129,630 | 4/1964 | Wing et al. . |
| 3,262,353 | 7/1966 | Waeltz et al. . |
| 3,271,058 | 9/1966 | Anderson ................................. 411/383 |
| 3,443,474 | 5/1969 | Blakely et al. . |
| 3,596,948 | 8/1971 | Spoehr . |
| 3,643,544 | 2/1972 | Massa . |
| 4,142,439 | 3/1979 | Landt . |
| 4,168,650 | 9/1979 | Dahl et al. . |
| 4,364,697 | 12/1982 | Binns . |
| 4,370,081 | 1/1983 | Briles . |
| 4,376,604 | 3/1983 | Pratt et al. . |
| 4,457,652 | 7/1984 | Pratt . |
| 4,595,324 | 6/1986 | Sadri . |
| 4,609,315 | 9/1986 | Briles . |
| 4,659,271 | 4/1987 | Pratt et al. . |
| 4,659,272 | 4/1987 | Pratt .......................................... 411/54 |
| 4,699,552 | 10/1987 | Jeal .......................................... 411/54 |
| 4,950,115 | 8/1990 | Sadri . |
| 4,967,463 | 11/1990 | Pratt . |
| 5,178,502 | 1/1993 | Sadri . |
| 5,238,342 | 8/1993 | Stencel . |
| 5,399,052 | 3/1995 | Volkmann et al. . |

OTHER PUBLICATIONS

Copy of Composi–Lok II catalog, Monogram Aeerospace Fasteners, 1991.
Copy of Radial–Lok catalog, Monogram Aerospace Fasteners, 1992.

*Primary Examiner*—Flemming Saether
*Attorney, Agent, or Firm*—Edgar A. Zarins; Lloyd D. Doigan

[57] ABSTRACT

A blind fastener for clamping sheet components and including a mechanical lock to prevent loosening of the fastener. The fastener is self-expanding following insertion and engagement of the threaded stem. The fastener includes an internally threaded nut body, an externally threaded stem threadably received within the nut body, and a lock sleeve matingly receiving the nut body. Carried on the stem is an expandable sleeve which expands to engage the underside of the material. Rotation of the stem following insertion of the assembly into the aperture will draw the stem head and expandable sleeve against the backside for the material causing the sleeve to expand outwardly. In addition, the locking sleeve is pushed beneath the expansion sleeve wedging between the threaded stem and expansion sleeve. This mechanical lock is resistant to vibration locking the fastener against loosening.

15 Claims, 2 Drawing Sheets

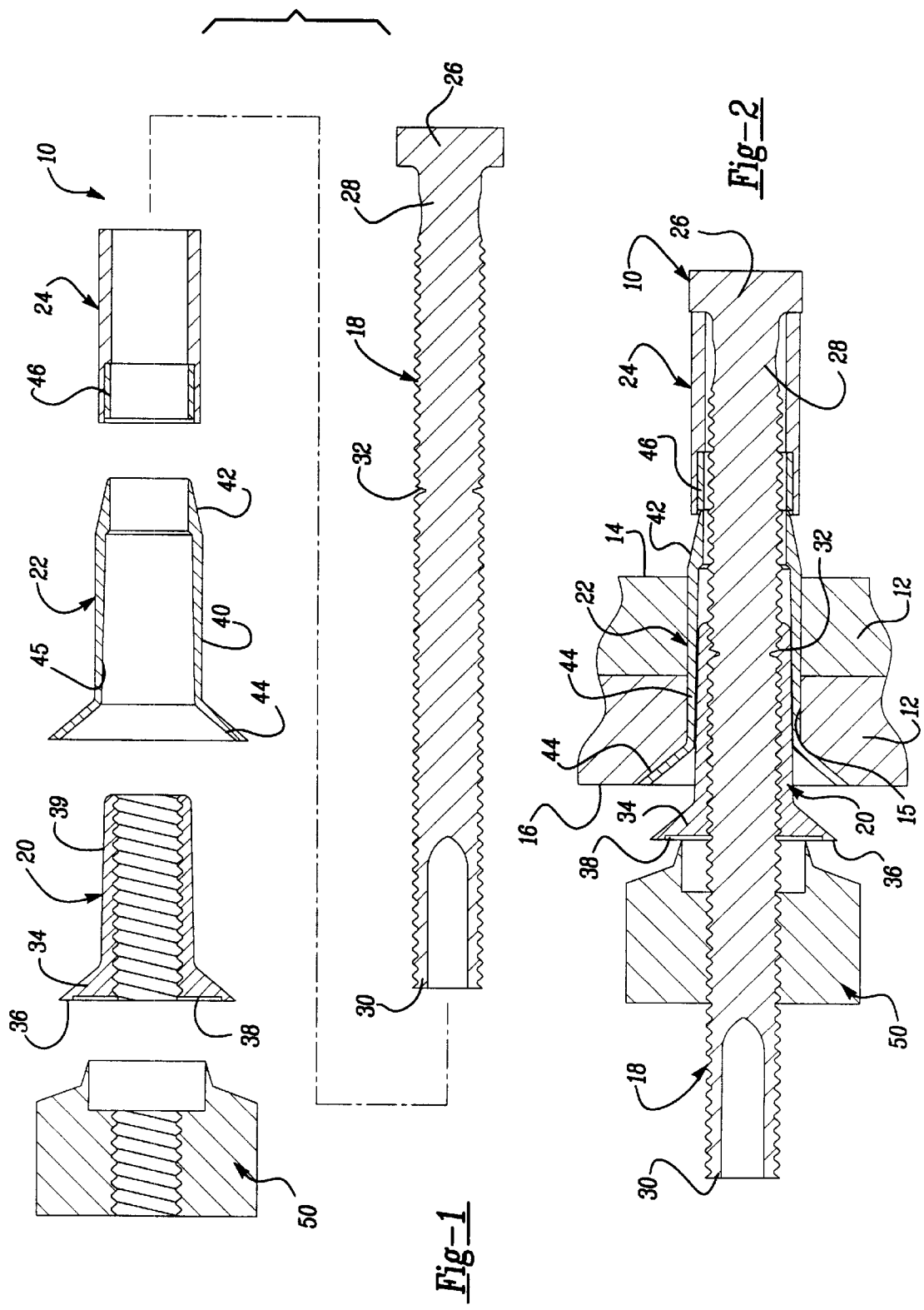

SELF-EXPANDING BLIND FASTENER WITH MECHANICAL LOCK

BACKGROUND OF THE INVENTION

I. Field of the Invention

This invention relates to blind fasteners for securing sheet material and, in particular, to a blind fastener with a self-expanding sleeve having a mechanical lock to prevent loosening of the fastener.

II. Description of the Prior Art

Blind fasteners have become particularly useful in securing sheet materials where it is impossible to access the underside of the material. Typically such fasteners are inserted into an aperture through the material and include a threaded stem for engaging the fastener. Rotation of the stem draws an expansion member into engagement with the underside of the material. Expansion may be aided by a nut body which forces the expansion member radially outwardly to engage the underside. Upon complete expansion to fully clamp the sheet material, the exterior end of the threaded stem may be broken away to eliminate any protrusions from the exterior surface.

Such fasteners have wide application in aircraft and space vehicle assembly. However, the vibrations and sonic fatigue such vehicles are subject to cause loosening of the fastener. Various locking features have been incorporated into such fasteners with various degrees of success. Although it is desirable to ensure locking of the fastener, the fastener must lend itself to robotic installation during assembly of the vehicle.

SUMMARY OF THE PRESENT INVENTION

The present invention overcomes the disadvantages of the prior known blind fasteners by providing a fastener which can be installed with robotic equipment, uniformly expands within the aperture, and includes a mechanical lock to resist loosening of the fastener.

The blind fastener of the present invention includes an externally threaded stem threadably received within an internally threaded nut body. The nut body has a driver head engageable by a drive member mounted to the stem for robotic installation of the fastener. The nut body is matingly received within a lock sleeve. The lock sleeve is seated within the aperture and includes an interior end with wedge-type ramps for locking engagement with the threaded stem. Carried on the interior end of the threaded stem is an expansion member designed to expand uniformly radially outwardly to clamp against the interior surface surrounding the aperture.

Following insertion of the fastener into the aperture, the stem is rotated relative to the nut body drawing the stem outwardly. As the head of the stem is drawn toward the sheet material, the expansion member will be pushed against the wedge end of the lock sleeve causing the expansion member to expand outwardly. As the expansion member engages the interior surface of the sheet material, further movement of the stem head will axially compress and radially expand the expansion member against the interior wall surrounding the aperture. Simultaneously, the wedge end for the lock sleeve is driven radially inwardly to engage the stem and prevent loosening rotation. In a preferred embodiment, the stem includes a reduced diameter shank portion to lockingly wedge the end of the lock sleeve between the expansion member and the threaded stem.

Other objects, features and advantages of the invention will be apparent from the following detailed description taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an exploded view of a blind fastener embodying the present invention;

FIG. 2 is an assembled cross-sectional view thereof;

DETAILED DESCRIPTION OF A PREFERRED EMBODIMENT OF THE PRESENT INVENTION

Figure 3:
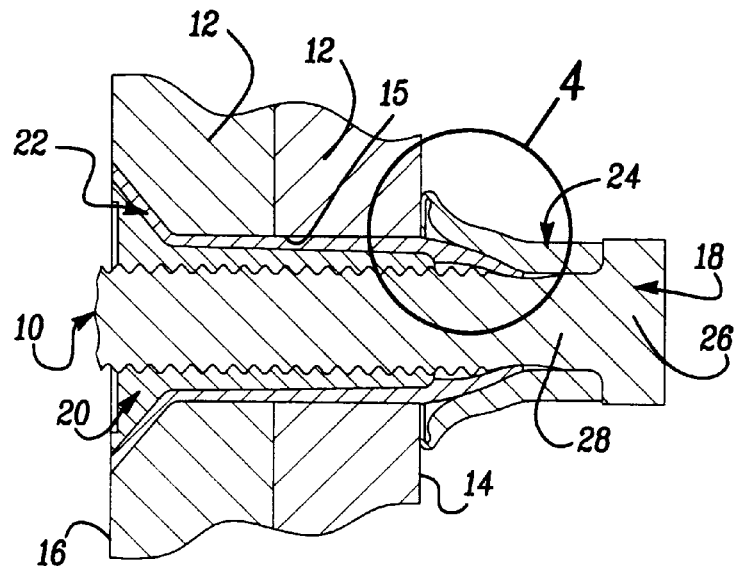
FIG. 3 is a cross-sectional view of the fastener expanded within an aperture.

Referring first to FIGS. 1 and 2, there is shown a self-expanding blind fastener 10 for securing materials such as overlapping sheet metal 12. The fastener 10 is designed to create a clamping force thereby holding the sheet material together. The fastener 10 is particularly useful in the assembly of aircraft and space vehicles where access to an interior surface 14 of the sheets 12 is not possible. The outer end of the fastener 10 can be broken away following installation leaving a smooth aerodynamic exterior surface 16. The fastener 10 of the present invention includes a locking feature to prevent the fastener from loosening and losing its clamping force even when the fastener is subjected to high levels of stress and vibration.

The fastener 10 generally includes an externally threaded stem 18, an internally threaded nut body 20, a lock sleeve 22 and an expansion member 24. The threaded stem 18 has an enlarged head 26, a reduced diameter shank or neck portion 28 and a tail 30. The stem 18 also has a frangible groove 32 for breaking the stem 18 upon complete installation.

The stem 18 is threadably received within the nut body 20 which includes an enlarged head portion 34. In a preferred embodiment, the face 36 of the head portion 34 is slotted 38 or incorporates alternative means for receiving a drive member as will be subsequently described. The outer surface 39 of the nut body 20 is tapered from the head portion 34 to a reduced diameter inner head.

The nut body 20 is matingly received within the lock sleeve 22 which has a similar configuration including a tubular body 40 having a wedged or ramped end 42. A flared flange 44 is formed at the outer end of the sleeve to receive the enlarged head portion of the nut body 20. An inner surface 45 of the lock sleeve 22 is also tapered however the inner diameter of the lock sleeve 22 is smaller than the outer diameter of the nut body 20. As the nut body 20 is drawn into the lock sleeve 22 during installation, the lock sleeve 22 will expand outwardly against the aperture 15 within the sheet material 12 creating an interference fit against the material.

Carried on the threaded stem 18 proximate the head 26 is the expansion member 24. The expansion member 24 has a substantially tubular configuration and is deformable upon compression by the stem head 26. The expansion sleeve 24 includes a soft sealing material 46, such as delrin, to improve the sealing expansion of the fastener 10.

Figure 4:
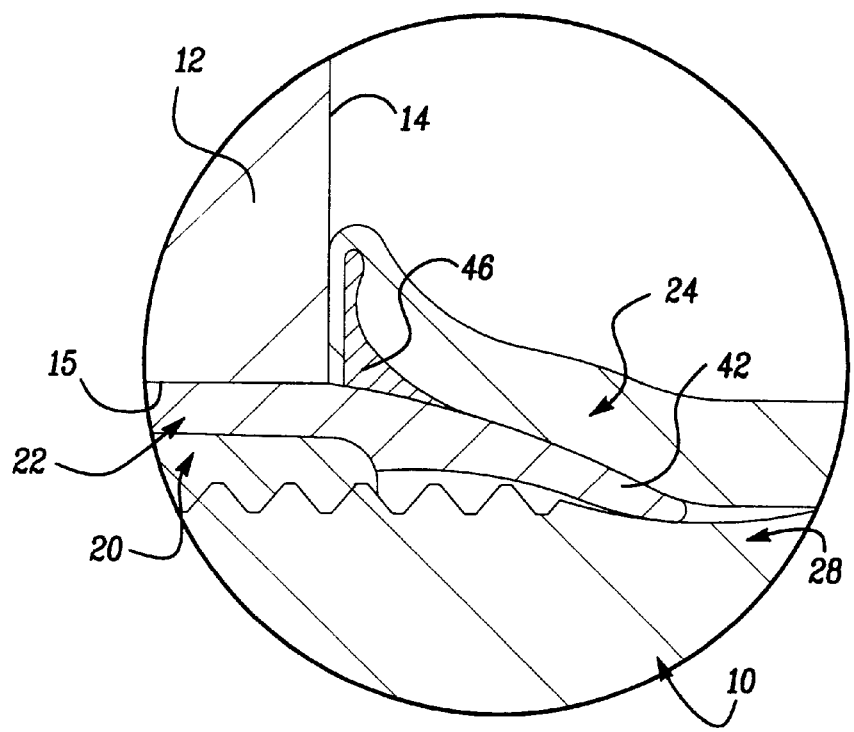
FIG. 4 is an enlarged partial view of the expanded fastener.

As best shown in FIG. 2, the assembled fastener 10 is inserted into the aperture 15 of the material 12 with the stem head 26 positioned beyond the inner surface 14. The lock sleeve 22 will be positioned in the aperture 15 with the nut body 20 and stem 18 extending therethrough. A drive member 50 is threadably attached to the stem 18 until it engages the face 36 of the nut body 20. Using either robotic or manual equipment, torque is applied to the drive member 50 to rotate it relative to the stem 18 to draw the head 34 of the nut body 20 and the head 26 of the stem 18 towards each other. As the nut body 20 is drawn further into the lock sleeve 22 the tapered outer surface 39 will expand the lock sleeve 22 into interference engagement with the aperture 15. As the stem 18 is drawn outwardly the stem head 26 will force the expansion member 24 over the wedge end 42 of the lock sleeve 22 causing it to deform against interior surface 14 (FIG. 3). Deformation of the sleeve 24 against the interior surface 14 creates a clamping force in conjunction with the head portion 34 against the exterior surface 16. Simultaneously, the wedge end 42 of the lock sleeve 22 is directed radially inwardly by the expansion member 24 to wedge between the expansion member 24 and the shank 28 of the stem 18 (FIG. 4).

The interference created by the wedged lock sleeve 22 the stem 18 and expansion member 24 prevents rotation of the stem 18 even under the stresses, vibration and sonic fatigue associated with aircraft. For ease of assembly, the fastener 10 can be installed using a rotary type driver 50 which operates well with robotic equipment. Furthermore, the uniform radial expansion of the lock sleeve 22 within the aperture 15 improves the fatigue life of the structure. This radial expansion occurs the full length of the aperture through the material 12.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fastener comprising:
    an externally threaded stem having an enlarged head;
    a nut body having an internally threaded bore for threadably receiving said stem;
    a lock sleeve adapted to be received within an aperture of a workpiece and having a surface adapted to engage an outer surface of the workpiece, said nut body selectively matingly received within said lock sleeve, said lock sleeve including a wedge end; and
    an expansion member seated on said stem proximate said stem head wherein rotation of said stem relative to said nut body in a tightening direction moves said stem in an axial outward direction compressing said expansion member over said wedge end of said lock sleeve into contact with an inner surface of the workpiece, said expansion member directing said wedge end into locking contact with said stem to prevent relative rotation in a lessening direction between said nut body and said stem when said fastener is fully set.

2. The fastener as defined in claim 1 wherein said threaded stem includes a reduced diameter shank proximate said stem head, said wedge end of said lock sleeve wedging between said expansion member and said stem shank to prevent rotation in said loosening direction.

3. The fastener as defined in claim 1 wherein said surface for engaging the workpiece includes a flared flange for engaging an outer surface of the workpiece.

4. The fastener as defined in claim 3 wherein said nut body has an enlarged head portion, said head portion seated within said flared flange of said lock sleeve upon setting of said fastener.

5. The fastener as defined in claim 4 wherein said head portion of said nut body includes an outer face having means for driving said nut body.

6. The fastener as defined in claim 5 and further comprising a drive member selectively threadably engageable with said stem and drivably engageable with said means of said nut body.

7. The fastener as defined in claim 1 wherein said nut body has a tapered exterior surface and said lock sleeve has a tapered interior surface such that insertion of said nut body into said lock sleeve upon setting said fastener causes said lock sleeve to expand radially outwardly in the workpiece aperture.

8. The fastener as defined in claim 1 wherein said expansion member includes an elastic ring.

9. A fastener comprising:
    an externally threaded stem having an enlarged head and a reduced diameter shank proximate said stem head;
    a nut body having an internally threaded bore for threadably receiving said stem;
    a lock sleeve adapted to be received within an aperture of a workpiece and having a surface adapted to engage an outer surface of the workpiece, said nut body selectively matingly received within said lock sleeve, said lock sleeve including an interior end with a ramped wedge surface; and
    an expansion member seated on said stem proximate said stem head wherein rotation of said stem relative to said nut body in a tightening direction moves said stem in an axial outward direction compressing said expansion member over said ramped wedge surface of said lock sleeve into contact with an inner surface of the workpiece, said expansion member directing said wedge end of said lock sleeve radially inwardly into locking contact with said stem shank to prevent relative rotation in a loosening direction between said nut body and said stem when said fastener is fully set.

10. The fastener as defined in claim 9 wherein said lock sleeve surface for engaging the workpiece is a flared flange projecting outwardly from a tubular body of said lock sleeve.

11. The fastener as defined in claim 10 wherein an interior surface of said lock sleeve body is longitudinally tapered and an exterior surface of said nut body is longitudinally tapered such that insertion of said nut body into said lock sleeve upon setting said fastener causes said lock sleeve to expand radially outwardly in the workpiece aperture.

12. The fastener as defined in claim 11 wherein said nut body has an enlarged head portion, said head portion seated within said flared flange of said lock sleeve upon setting of said fastener.

13. The fastener as defined in claim 12 wherein said head portion of said nut body includes an outer face having a means for driving said nut body.

14. The feature as defined in claim 13 and further comprising a drive member selectively threadably engageable with said stem and driveably engageable with said nut body.

15. A fastener comprising:
    an externally threaded stem having an enlarged head and a reduced diameter shank proximate said stem head;
    a nut body having an internally threaded bore for theadably receiving said stem and an outer surface with a tapered diameter along at least a portion of said nut body;
    a lock sleeve adapted to be received within an aperture of a workpiece and having a flange adapted to engage an outer surface of the workpiece, said lock sleeve including an interior end with a ramped wedge surface and an interior surface with a tapered diameter along at least a portion of said nut body, said lock sleeve selectively matingly receiving said nut body to engage said interior and outer tapered surfaces; and an expansion member seated on said stem proximate said stem head wherein rotation of said stem relative to said nut body in a tightening direction moves said stem in an axial outward direction compressing said expansion member over said ramped wedge surface of said lock sleeve into contact with an inner surface of the workpiece, said expansion member directing said wedge end of said lock sleeve radially inwardly into locking contact with said stem shank to prevent relative rotation in a loosening direction between said nut body and said stem when said fastener is fully set.

* * * * *